United States Patent [19]

Hanecka et al.

[11] Patent Number: 4,464,690
[45] Date of Patent: Aug. 7, 1984

[54] HELICAL SCAN RECORDER WITH THREE-POINT HEAD MOUNTING

[75] Inventors: Lubomir Hanecka; Heinrich Hütter, both of Vienna, Austria

[73] Assignee: U.S. Philips Corporation, New York, N.Y.

[21] Appl. No.: 465,382

[22] Filed: Feb. 10, 1983

Related U.S. Application Data

[63] Continuation of Ser. No. 227,829, Jan. 23, 1981, abandoned.

[30] Foreign Application Priority Data

Apr. 14, 1980 [AT] Austria ................................. 2009/80
Feb. 13, 1983 [AT] Austria .................................. 775/80

[51] Int. Cl.³ ............................................... G11B 5/08
[52] U.S. Cl. ......................................... 360/84; 360/85; 360/130.22; 403/373
[58] Field of Search .................................... 360/84–85, 360/95, 104, 107, 129; 403/373, 374, 334, 290; 292/256.6

[56] References Cited

U.S. PATENT DOCUMENTS

| | | | |
|---|---|---|---|
| 3,021,049 | 2/1962 | Settle | 403/374 X |
| 3,165,342 | 1/1965 | Anderson | 403/374 |
| 3,354,672 | 11/1967 | Klaeui | 403/373 X |
| 3,396,596 | 8/1968 | Fischer | 403/373 X |
| 3,449,002 | 6/1969 | Bernard | 403/373 |
| 4,110,054 | 8/1978 | Moeller, Jr. | 403/373 |
| 4,142,811 | 3/1979 | Burnham | 403/373 X |
| 4,197,505 | 4/1980 | Watanabe | 360/84 X |
| 4,215,961 | 8/1980 | Babel | 403/373 X |

FOREIGN PATENT DOCUMENTS

| | | | |
|---|---|---|---|
| 345577 | 9/1978 | Austria | 403/373 X |
| 2354902 | 7/1975 | Fed. Rep. of Germany | 403/373 |
| 32274 | 5/1921 | Norway | 403/373 |
| 1046938 | 10/1966 | United Kingdom | 403/373 |

*Primary Examiner*—John H. Wolff
*Attorney, Agent, or Firm*—David R. Treacy

[57] ABSTRACT

An arrangement for mounting a hub on a shaft such as the rotatable head support of a helical scan tape recorder. The hub has a tubular portion coaxial with the shaft, which is clamped onto the shaft by a device having three clamping jaws which are force-coupled to each other and engage the tubular portion at equally spaced locations circumferentially around the shaft in a plane substantially perpendicular to the shaft, the clamping surface of at least one clamping jaw being adjustable by an adjusting device to move the clamping surface in a direction substantially perpendicular to the shaft axis. One or all of the jaws may be pivotally interconnected to the other jaws.

21 Claims, 13 Drawing Figures

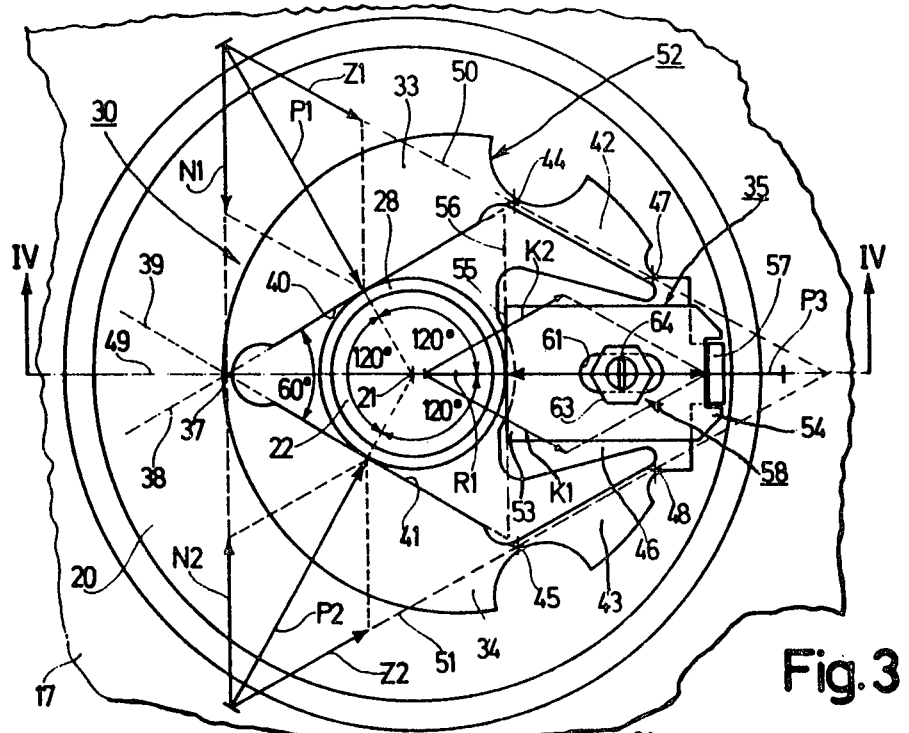
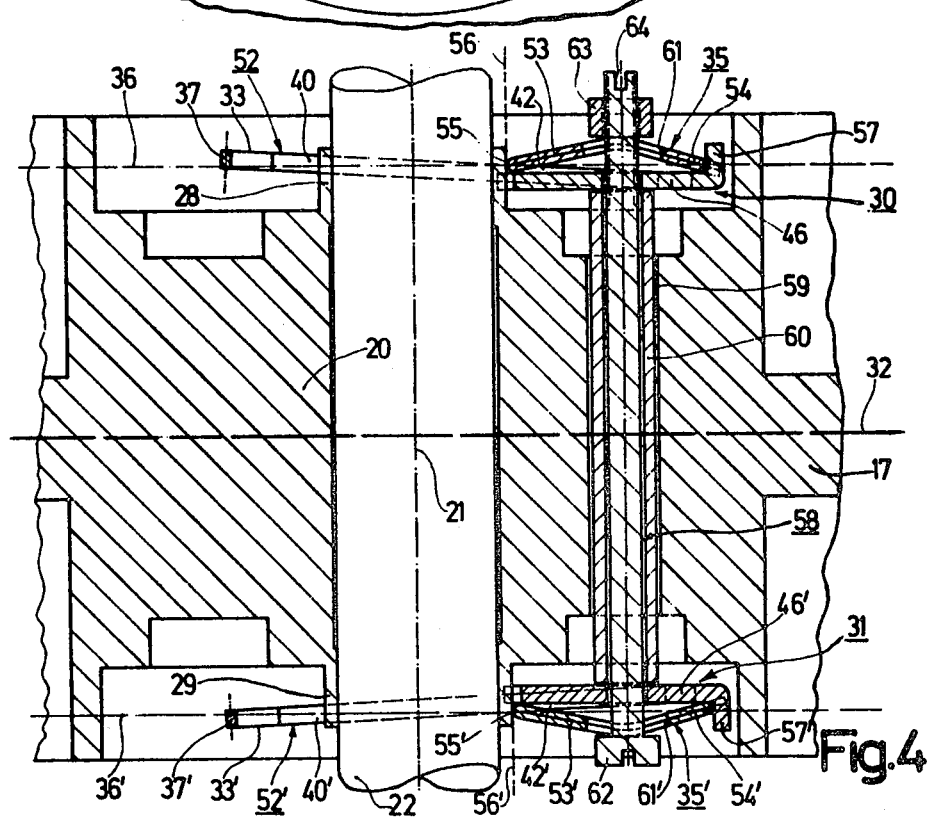

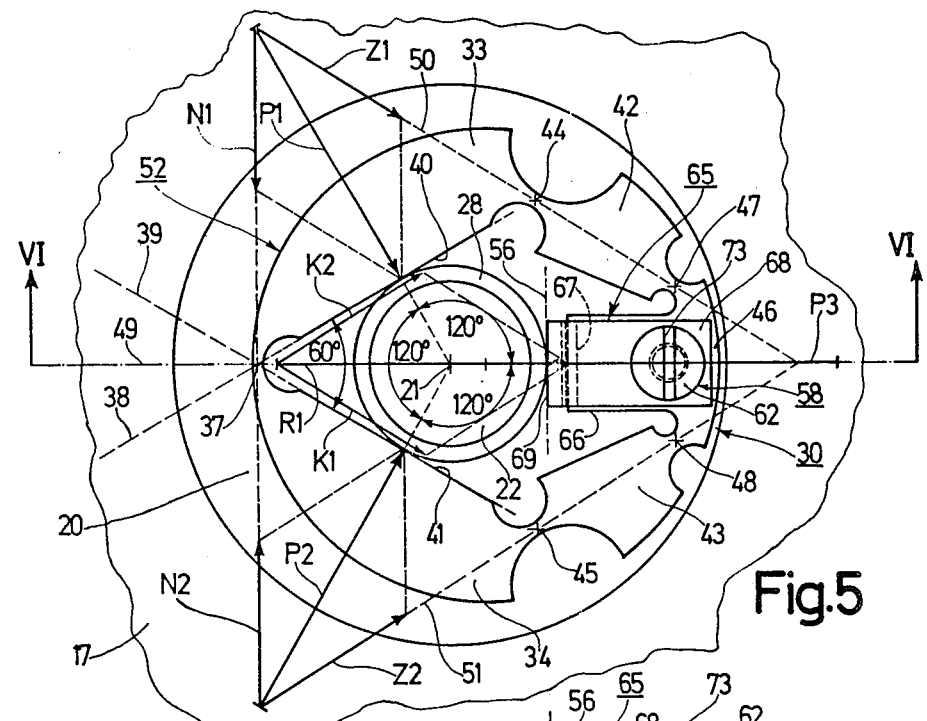
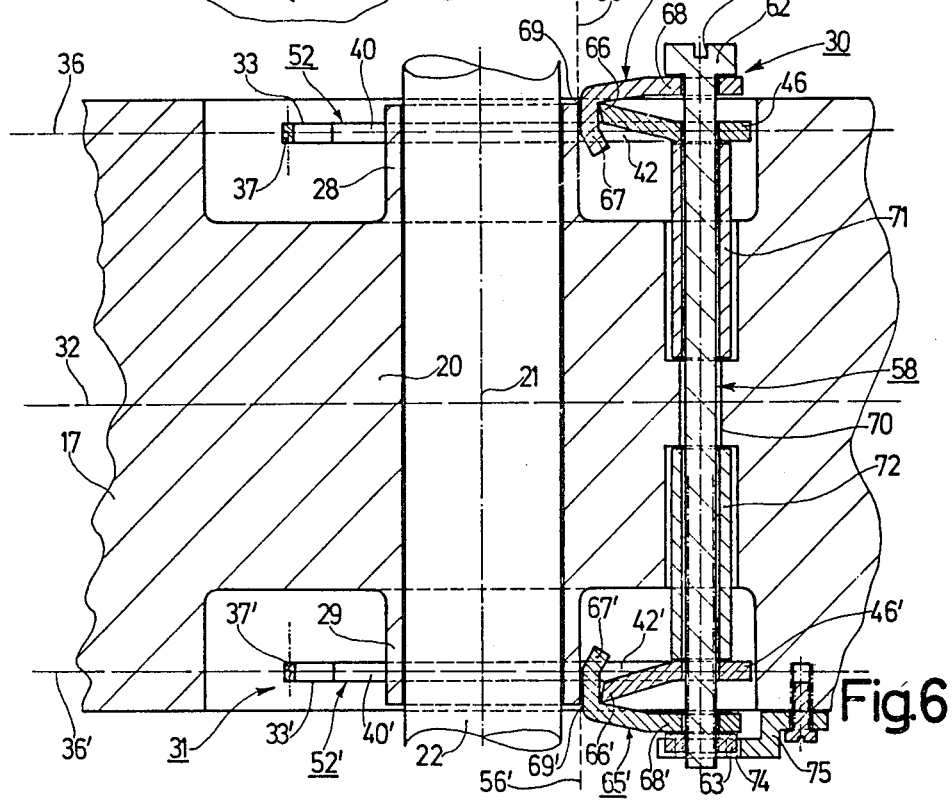

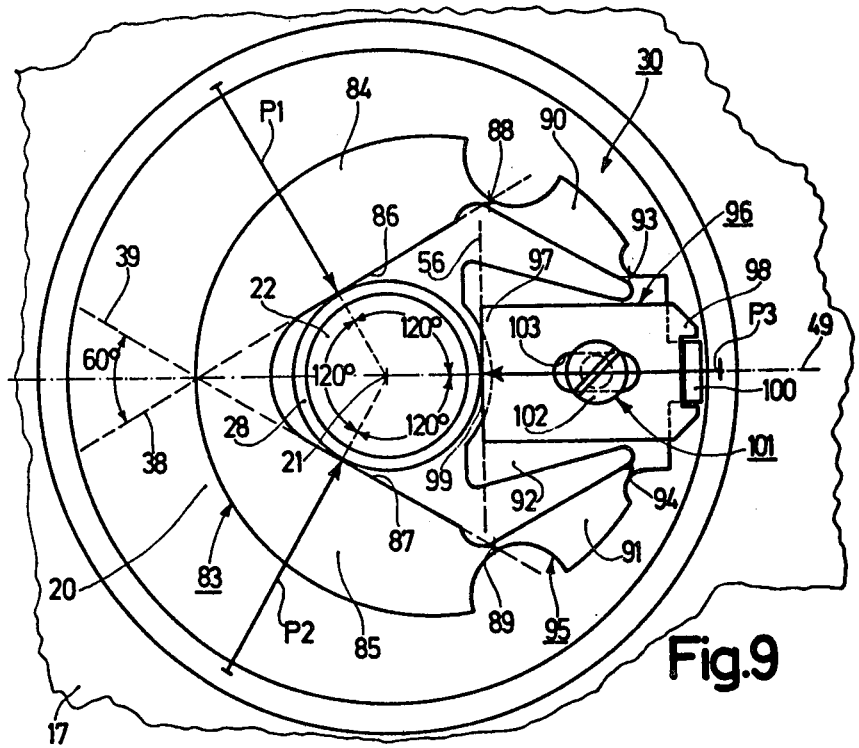
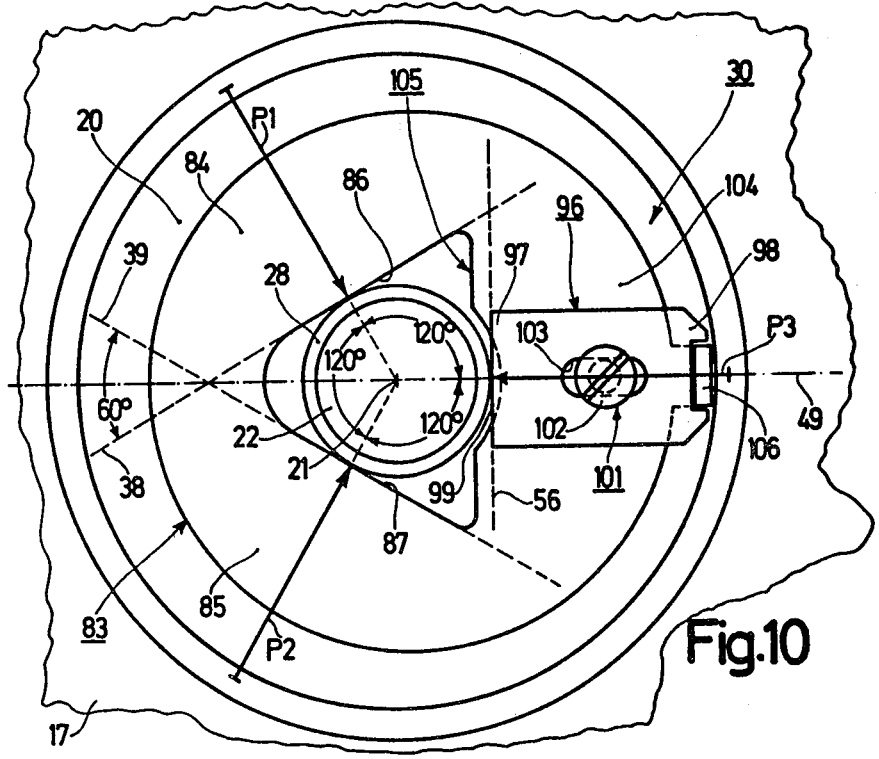

HELICAL SCAN RECORDER WITH THREE-POINT HEAD MOUNTING

This is a continuation of application Ser. No. 227,829, filed Jan. 23, 1981, now abandoned.

BACKGROUND OF THE INVENTION

The invention relates to a recording and/or reproducing apparatus for use with a magnetizable record carrier in the form of a tape, and more particularly to such an apparatus which comprises at least one rotatable magnetic head which scans the record carrier along information tracks, the head being mounted on a support which has a hub by means of which the support is force-coupled to a rotatable shaft (hereinafter referred to as a "rotating head recorder"). The hub comprises at least one axially projecting tubular portion which is coaxial with the shaft and on which is placed a releasable clamping device for engaging the tubular portion and clamping it on the shaft so as to provide the force coupling between the support and the shaft. Such apparatus is known, for example, from Austrian Patent Specification No. 345 577.

In that known apparatus the clamping device is constituted by an annular, split, clamping ring which surrounds the tubular portion substantially over its full circumference in order to deform and thus clamp the tubular portion on the shaft. When the tubular portion is clamped in position, the clamping ring should uniformly tighten and urge the tubular portion against the shaft over substantially its entire circumference. This arrangement requires comparatively large deformation forces. However, the application of such large deformation forces may lead to a deformation of the shaft, which deformation remains after tightening and thus results in an eccentric rotation of the support when the shaft is driven. Such an eccentricity of the support, which may for example carry two magnetic heads, will adversely affect the recording and/or reproduction of information on and/or from the record carrier. For more information regarding the requirements for a highly accurate and also a highly reproduceable mounting of rotating vicks recorder head drums, reference may be made to U.S. Pat. No. 4,321,639; and to U.S. patent application Ser. No. 180,779 filed Aug. 25, 1980, and Ser. No. 389,536 filed June 18, 1982 which is a continuation of Ser. No. 144,730 filed Apr. 28, 1980, assiged to the assignee of the instant application (herewith incorporated by reference).

SUMMARY OF THE INVENTION

It is an object of the invention to provide a clamping device for a rotating head recorder for clamping a magnetic head support onto a shaft with the use of smaller deformation forces than before, but which guarantees that the support is reliably and accurately clamped on the shaft without the actual clamping operation having any adverse effect on the entire system.

Another object is to provide a clamping device which is simple to operate, so that the support can be both mounted and removed in a simple manner. This is of importance for example, with respect to mechanization of the clamping operation, but is equally advantageous during mounting or replacement of the support. Such replacement of the support may be required several times, because the magnetic heads mounted on the support have only a limited lifetime. Furthermore, such a clamping device should guarantee that every support which it secures to the shaft occupies exactly the same position, so that the conditions are always the same during the recording and/or reproducing processes.

To this end the invention is characterized in that the clamping device comprises first, second and third clamping jaws which are force-coupled to each other and which each have a clamping surface which engages the tubular portion in a plane tangential thereto, the clamping surfaces engaging the tubular portion at locations which are spaced circumferentially around the shaft at an angular distance of 120° from each other substantially in one plane perpendicular to the shaft axis; and an adjusting device for adjusting at least one of the three clamping jaws to move its clamping surface in a direction substantially perpendicular to the shaft axis and, when said clamping jaw is adjusted in order to clamp the tubular portion onto the shaft, for causing each of the three clamping jaws exert a clamping force on the tubular portion, which force is directed perpendicularly to the tangential plane in which the clamping surface of the respective clamping jaw engages the tubular portion.

In this way it is achieved that the clamping device always clamps the support on the shaft in an accurate and reliable manner, and engages centrally-symmetrically with the tubular portion in an entirely statically defined manner, because the device does not act over the full circumferences of said portion but only at three points of application which are uniformly spaced at 120° from each other and which are substantially disposed in one plane which extends perpendicularly to the shaft axis. The clamping forces exerted at the three points of application by the three clamping jaws are exactly equal and are exactly centered relative to the tubular portion and the shaft respectively. This exactly symmetrical engagement of the clamping device with the tubular portion ensures that inherently the shaft cannot be deformed as a result of the clamping action exerted by the clamping device.

Since the clamping device acts on the tubular portion at only three points of application which are spaced 120° from each other, the tubular portion is deformed so as to press against the shaft at only three locations when it is being clamped in place, and therefore only comparatively small deformation forces are required. In this way all the defects and problems which occur when the shaft is deformed are avoided, so that correct and satisfactory information recording and/or reproduction process is made possible and thus a high-quality recording and/or reproducing apparatus is obtained.

In the apparatus in accordance with the invention the tubular portion is clamped onto the shaft by adjusting that clamping jaw on which the actuating force required for clamping is to be exerted or to which it is to be transmitted. By a suitable construction of the clamping jaws, for which of course various possibilities exist, the requirements and specifications for simple actuation of the clamping device can readily be met. In this way simple operation of the clamping device can readily be achieved, thus enabling easy mounting and removal of the support in order to replace the support, if for example the magnetic head arranged on that support exhibits excessive wear or is defective.

In a preferred embodiment of the invention the first and second clamping jaws are interconnected by a first pivotal joint and each have a clamping surface which engages the tubular portion in a plane tangential thereto, the two tangential planes in which the clamping surfaces of the first and second clamping jaws engage the tubular portion enclosing an angle of 60° with each other; if the clamping device further comprises a first connecting bar which is connected to the first clamping jaw by a second pivotal joint, and a second connecting bar which is connected to the second clamping jaw by a third pivotal joint, the first and second connecting bars being interconnected by at least one further pivotal joint and the axes of all said joints extending substantially parallel to the shaft axis, and the axis of the first joint being disposed in a longitudinal plane of engagement symmetry relative to the two tangential planes in which the clamping surfaces of the first and second clamping jaws engage the tubular portion, this plane of symmetry containing the shaft axis; the axis of the second joint and the axis of the third joint are arranged mirror-symmetrically with respect to each other relative to the longitudinal plane of engagement symmetry, and a first connecting plane which contains the axes of the second and the at least one further joint connected to the first connecting bar, and a second connecting plane, which contains the axes of the third pivotal joint and the at least one further joint connected to the second connecting bar, these first and second connecting planes intersecting each other in the longitudinal plane of symmetry; and the third clamping jaw bears against an abutment provided in the vicinity of the at least one further joint, and comprises a clamping surface which engages the tubular portion in a further plane tangential thereto which extends perpendicularly to the longitudinal plane of engagement symmetry, by means of the adjusting device the third clamping jaw being adjustable to move its clamping surface relative to the abutment in a direction which is substantially perpendicular to the shaft axis in order to obtain the force coupling between the support and the shaft. Such a clamping device can be placed on the tubular portion by simply fitting it onto the portion in the direction of the shaft axis. For clamping the tubular portion onto the shaft it is necessary only to adjust a single clamping jaw. The pivotal interconnection of the three clamping jaws further ensure that when the tubular portion is clamped onto the shaft, the three clamping jaws are so positioned relative to each other that although only one clamping jaw is adjusted by means of the adjusting device all the three clamping jaws always exert equal clamping forces on the tubular portion. These forces are also then centered relative to the shaft. This results in a uniform force distribution on the tubular portion and on the shaft respectively, so that deformation of the shaft is precluded. The simple actuation moreover ensures that both mounting and removing, such as during replacement of the support, can be effected in a simple and reproducible manner.

In this preferred embodiment it is advantageous if the abutment for the third clamping jaw is constituted by a third connecting bar which extends between the first connecting bar and the second connecting bar and which is connected to the first connecting bar through a first further pivotal joint and to the second connecting bar through a second further pivotal joint, the first connecting plane containing the axes of the second joint and the first further joint and the second connecting plane containing the axes of the third joint and the second further joint. In this way a reliable and stable embodiment is obtained, which has a particularly simple and compact construction.

It is further advantageous if the third clamping jaw of the clamping device is constituted by a resilient expander which is bent into substantially a V-shape along a line which extends perpendicularly to the longitudinal plane of engagement symmetry described above, the expander thereby comprising a first expander limb and a second expander limb, the free end of the first expander limb constituting the clamping surface of the third clamping jaw and the free end of the second expander limb bearing against the third connecting bar, and if a screwthreaded adjusting device acts on the expander substantially at the junction of the two expander limbs, these said limbs being expanded by the actuation of adjusting device in order to clamp the tubular portion onto the shaft. Thus the desired result is obtained in a simple manner with a small actuating force, because the expander enables one to provide a high force transmission ratio between the clamping forces and the required actuating force. Since the expander limbs are resilient, this further yields the advantage that in the case of mass production the clamping forces provided by the expander limbs of the various clamping devices are relatively independent of tolerances and adjustment accuracies, because different tolerances and slight differences in adjustment are compensated for by the resilient properties. Thus in any case substantially equal clamping forces are obtained. Furthermore, clamping, which is effected by tightening the screwthreaded adjusting device, is simple and easy, so that the support can readily and rapidly be replaced.

The expander may for example be constituted by a simple V-shaped resilient sheet-metal component. However, it is found to be particularly advantageous if the expander, which serves as the third clamping jaw, is constituted by a substantially V-shaped leaf spring comprising at least two laminations. This ensures that the actuating force for expanding the expander is small, because a laminated expander having an overall thickness equal to the sum of the thicknesses of the individual laminations is easier to expand than a single-layer expander having the same overall thickness, while in a direction substantially perpendicular to the shaft axis substantially the same load may be exerted on the laminated expander in order to clamp the tubular portion onto the shaft.

In a different advantageous embodiment the third clamping jaw of the clamping device is constituted by an L-shaped bracket, which is supported on the third connecting bar so as to be pivotable relative to this bar about an axis perpendicular to the plane of engagement symmetry. The bracket has a first limb which extends substantially parallel to the shaft axis and a second limb which extends substantially perpendicularly to the shaft axis, the clamping surface of the third clamping jaw being formed on the first limb. A screwthreaded adjusting device acts on the second limb, the bracket being pivotable relative to the third connecting bar by the actuation of the adjusting device to clamp the tubular portion onto the shaft. This provides a simple and robust clamping device which can be readily actuated with small actuating forces, the ratio between the actuating force and the resulting clamping forces being defined by a suitable choice of the lengths of the limbs of the bracket.

According to a particularly preferred embodiment the hub of the support is provided with two tubular portions which project axially in opposite directions from the hub coaxial with the shaft. Each of the portions is engaged by a clamping device, the two third clamping jaws of the two clamping devices being arranged mirror-symmetrically with respect to each other relative to a transverse plane of symmetry which extends perpendicularly to the shaft axis between the two clamping devices for adjusting the two third clamping jaws a single screwthreaded adjusting device extends parallel to the shaft axis through the two third clamping jaws and is actuable to tighten these jaws relative to each other. This ensures a reliable absolutely play-free remounting of the support on the shaft, because the two tubular portions are clamping onto the shaft in two clamping zones which are spaced from each other in the axial direction of the shaft. This is of particular advantage if the support has comparatively large dimensions in the direction of the shaft axis. Clamping in two clamping zones ensures that the support, as it rotates, will exhibit neither radial nor axial unbalance. In this respect it is to be noted that, although the support is clamped on the shaft in two clamping zones which are spaced from each other in the axial direction of the shaft, the shaft is not deformed because of the symmetrical distribution of the clamping forces, so that problems as a result of such deformation are avoided. Furthermore, it is found to be particularly advantageous that both clamping devices can be actuated with the one screwthreaded adjusting device in a single operation, which is particularly simple and time-saving.

The clamping jaws and the connecting bars of the clamping device may be constructed as separate components formed, for example, with bores into which pins may be inserted to form the pivotal joints. However, in a particularly simple embodiment the first clamping jaw, the second clamping jaw and the connecting bars of a clamping device are a unitary element formed as an integral clamping plate, and the pivotal joints are constituted by hinges formed integrally with the clampin plate so as to be elastically deformable in a plane substantially perpendicular to the shaft axis. In this way a particularly compact, simple and reliable construction is obtained, so that the clamping plate can be manufactured easily and inexpensively by a simple mechanized punching operation.

In another embodiment of the invention, the first clamping jaw and the second clamping jaw are rigidly connected to each other and are constituted by the two limbs of a substantially V-shaped clamping member. Each limb has a clamping surface which engages the tubular portion in a plane tangential thereto, the two tangential planes in which the clamping surfaces of the first and second clamping jaws engage the tubular portion enclosing an angle of 60° with each other. The third clamping jaw preferably has a clamping surface which engages the tubular portion in a further plane tangential to the portion surface at the point of engagement. This further plane extends perpendicularly to the longitudinal plane of symmetry. To obtain the force coupling between the support and the shaft, the third clamping jaw is adjustable by the adjusting device t move its clamping surface in a direction which is substantially perpendicular to the shaft axis. This provides a clamping device which is simple to actuate, which also complies with the requirements for an exact clamping and which is furthermore of a simple and stable construction, so that a high degree of reliability is obtained.

With respect to the cooperation between the third clamping jaw and the V-shaped clamping member there are several possibilities. As an example, the third clamping jaw may be connected to the two limbs of the clamping member by means of screws. For a simple construction it is found that the third clamping jaw may be pivotally connected to at least one of the two limbs of the clamping member.

In this respect it is advantageous if two connecting bars are connected to the clamping member, one to each of the two limbs, through pivotal joints. The two connecting bars are in turn pivotally connected to each other and are arranged mirror-symmetrically with respect to each other relative to the longitudinal plane of symmetry. Preferably, the third clamping jaw bears against an abutment which is pivotally connected to the connecting bars and which is disposed substantially symmetrically relative to the longitudinal plane of symmetry, and, in order to obtain the force coupling between the support and the shaft, the third clamping jaw is adjustable relative to this abutment. This embodiment provides a simple and stable arrangement having a practically symmetrical construction, so that although only one clamping jaw is actuated in order to clamp the tubular portion onto the shaft, a uniform force distribution is guaranteed. As a result the tubular portion is clamped exactly in position on the shaft, without deforming the shaft.

With respect to the cooperation between the third clamping jaw and the V-shaped clamping member, in a different advantageous embodiment the third clamping jaw substantially takes the form of a bar that is connected at one end directly to one limb of the clamping member through a pivotal joint. At the other end the bar is connected to the other limb of the clamping member through a screw which functions as adjusting device and which extends substantially transversely of the shaft axis, in order to provide the force coupling between the support and the shaft. This also provides a simple and robust clamping device which, before the adjusting screw is fitted, can be opened in such a way that it can be placed on the tubular portion by radial movement; this may be advantageous depending on the construction of the support.

In yet another embodiment of the invention, the first clamping jaw, the second clamping jaw and the third clamping jaw are each constituted by a tongue which projects radially towards the shaft from a ring which is coaxial with the shaft, the tongues being inclined relative to the shaft and to the plane of the ring, and the free ends of the tongues constituting the clamping surfaces. To provide the force coupling between the support and the shaft, all the three clamping jaws are adjustable to move their clamping surfaces in directions substantially perpendicular to the shaft axis, be moving the ring in the direction of the shaft axis. With this embodiment, the precision of the clamping device is determined by the manufacturing precision of a single component.

The invention will be described in more detail with reference to the drawings, which show some embodiments to which the invention is not limited.

BRIEF DESCRIPTION OF THE DRAWING

FIG. 3 is an enlarged diagrammatic plan view of a part of the guide drum shown in FIG. 2 taken on the line III—III in FIG. 2;

FIG. 4 is a sectional view taken on the line IV—IV in FIG. 3 showing a V-shaped expander;

FIG. 5, similarly to FIG. 3, is a diagrammatic plan view of a second embodiment of the invention incorporating an L-shaped clamping bracket;

FIG. 6 is a sectional view taken on the line VI—VI in FIG. 5;

FIG. 9, similarly to FIGS. 3 and 5, is a plan view of a fourth embodiment of the invention having rigidly connected first and second clamping jaws;

FIG. 10 also is a plan view of a fifth embodiment of the invention having a third clamping jaw abutment rigidly connected to the first and second jaws;

DESCRIPTION OF THE PREFERRED EMBODIMENTS

Figure 1:
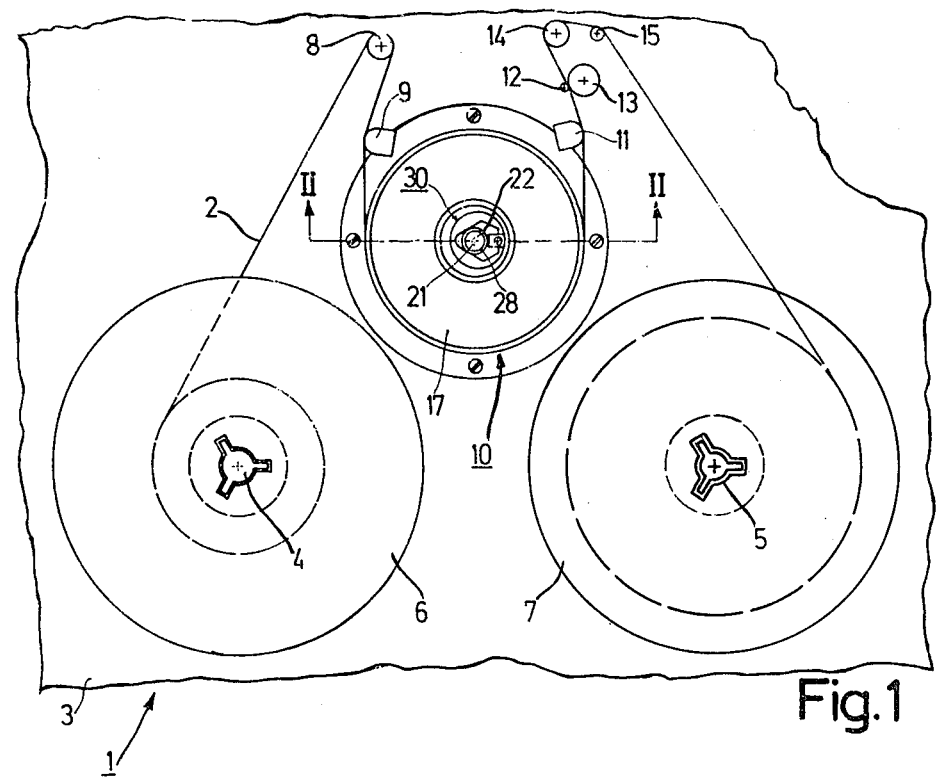
FIG. 1 is a schematic plan view of a part of a rotating head recorder which is wrapped partly around a two-part guide drum.

FIG. 1 schematically represents a part of a rotating head recorder for recording and/or reproducing video and audio information on a magnetizable record carrier 2 in the form of a tape, hereinafter briefly referred to as "tape". The apparatus 1 comprises a deck plate 3, which carries a supply spindle 4 and a take-up spindle 5, which respectively serve for driving a supply reel 6 and a take-up reel 7 placed on the corresponding winding spindles 4 and 5. Between the supply reel 6 and the take-up reel 7, the tape 2 travels round a tape-guide pin 8 for diverting the tape, past a magnetic erase-head 9 for erasing all the information stored on the tape, round a tape guide drum 10, to be described in more detail hereinafter, past a magnetic recording and/or playback head 11 for recording and/or reproducing audio information on the tape, between a capstan 12 and a pressure roller 13 which urges the tape against the capstan in a manner not shown to ensure uniform transport of the tape during recording and/or reproduction, and past two further tape guide pins 14 and 15 for diverting the tape 2. Obviously, the supply reel 6 and the take-up reel 7 may be accommodated in a cassette, in which case the tape can be extracted from the cassette and led past the previously mentioned components by means of an appropriate device.

Figure 2:
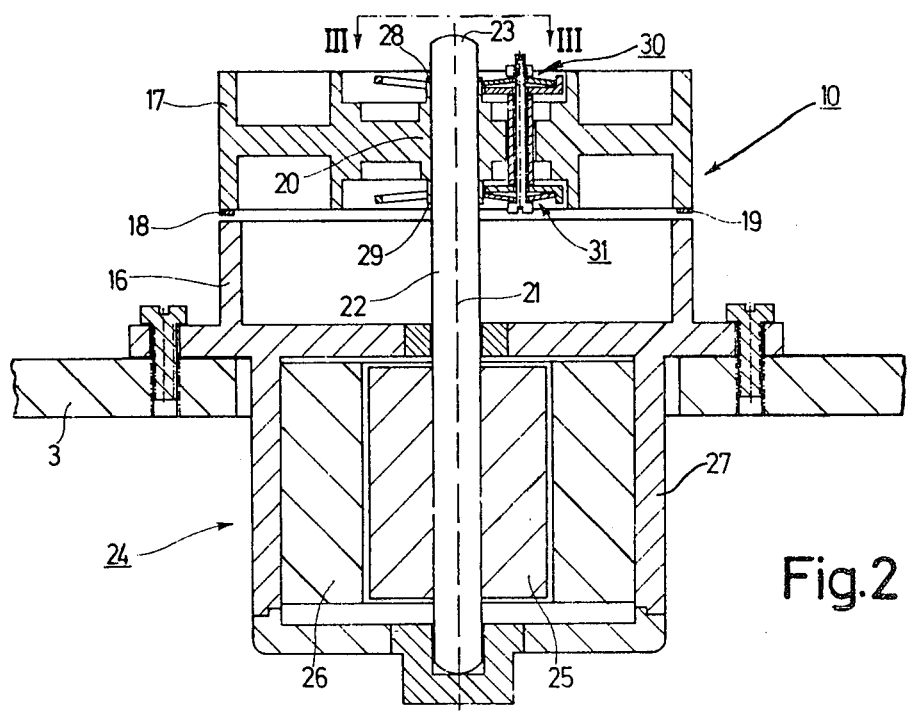
FIG. 2 is a sectional view of the guide drum of the apparatus of FIG. 1, taken on the line II—II in FIG. 1, the magnetic-head support being clamped onto the drive shaft with a pair of clamping devices in accordance with a first embodiment of the invention.

As is common practice in such equipment, the tape is helically wrapped around the circumferential surface of the tape guide drum. At least one rotatable magnetic head, which is accommodated in the drum and serves for recording and/or reproducing video information, scans the tape along information tracks which extend obliquely of the longitudinal direction of said tape. As can be seen in FIG. 2, the tape guide drum 10 in the present embodiment comprises a stationary drum half 16, which is rigidly mounted on the deck plate 3, and a rotatable drum half 17, which is coaxial with the stationary drum half.

The rotatable drum half 17, which in the present case serves as a support for two magnetic heads 18 and 19, comprises a hub 20, by the drum half 17 is force-coupled to the free end 23 of a shaft 22 which is rotatable about an axis 21. The shaft 22 and the drum half 17 are driven directly by a motor 24, shown schematically, which has a rotor 25 coaxially arranged on and connected to the shaft. The stator 26 of the motor is accommodated in a motor housing 27, which forms a unit with the stationary drum half 16. In this way the motor 24 and the complete tape guide drum 10 constitute an assembly which can be mounted on the deck plate 3.

The hub 20 comprises two tubular portions 28 and 29, are coaxial with the shaft and which project axially in opposite directions from the hub. Each of the portions 28 and 29 is engaged by a releasable clamping device 30 or 31 placed on the respective tubular portion. The two clamping devices, in order to provide the force coupling between the drum half 17 and the shaft 22, clamp the tubular portions 28 and 29 respectively onto the shaft 22 at two clamping areas which are axially spaced from each other. To enable satisfactory operation of the apparatus and faithful recording and/or reproduction of the video information by the magnetic heads, it is essential that the rotatable drum half 17, which serves as the magnetic-head support, is accurately and reliably clamped in position on the shaft 22 by the clamping devices 30 and 31, without the shaft being deformed or the shaft bearings being damaged during clamping.

Hereinafter the two clamping devices 30 and 31 will be described with reference to FIGS. 3 and 4. As can be seen in these figures, the two clamping devices are fully identical and are arranged mirror-symmetrically with respect to each other relative to a transverse plane of symmetry 32 (represented by a broken line in FIG. 4) which extends perpendicularly to the axis 21 of the shaft 22 and which is situated between the two clamping devices 30 and 31. For this reason the corresponding individual parts of the two clamping devices 30 and 31 bear the same reference numerals except for the addition of a "prime" symbol to each of the reference numerals for the parts of the clamping device 31.

Each of the two clamping devices 30 and 31 comprises a first clamping jaw 33 and 33' respectively, a second clamping jaw 34 and 34' respectively, and a third clamping jaw 35 and 35' respectively. The three clamping jaws of each clamping device 30 or 31 engage the respective tubular portion 28 or 29 at locations which are spaced circumferentially of the shaft 22 at an angular distance of 120° from each other and in respective planes 36 or 36' which extends perpendicularly to the shaft and are represented by a broken line in FIG. 4.

The first clamping jaw 33 or 33' and the second clamping jaw 34 or 34' of each clamping device are constituted by plate-shaped clamping levers which are interconnected by a first pivotal joint 37 or 37' respectively. The two clamping levers 33, 34 or 33', 34' have clamping surfaces 40, 41 or 40', 41' respectively which engage the respective tubular portion 28 or 29 in planes 38, 39, or respective planes 38', 39' which are not separately shown, which are tangential thereto and which are each represented by a broken line in FIG. 3. In this embodiment the clamping surfaces are plane surfaces. The two tangential planes 38, 39 or 38', 39' respectively, in which the clamping surfaces 40, 41 or 40', 41' of the respective first clamping lever 33 or 33' and the second clamping lever 34 or 34' engage the corresponding tubular portion 28 or 29, enclose an angle of 60° with each other.

Each of the two clamping devices 30 and 31 also includes a first plate-shaped connecting bar 42 or 42' respectively and a second plate-shaped connecting bar 43 or 43' respectively. The first connecting bar 42 or 42' is connected to the first clamping lever 33 or 33' through a second pivotal joint 44 or 44' respectively, and the second connecting bar 43 or 43' is connected to the second clamping lever 34 or 34' through a third pivotal joint 45 or 45' respectively. Between the first connecting bar 42 or 42' and the second connecting bar 43 or 43' there extends a third plate-shaped connecting bar 46 or 46' respectively, which is connected to the first connecting bar through a first further pivotal joint 47 or 47' respectively and to the second connecting bar through a second further pivotal joint 48 or 48' respectively.

The axes of all the pivotal joints extend substantially parallel to the axis 21 of the shaft 22. In this embodiment the axes of the joints are disposed at a small angle of approximately 3° relative to the shaft axis, but this has no influence on the performance of the clamping devices and may be regarded as negligibly small. The axis of the first joint 37 or 37' is situated in a longitudinal plane of symmetry 49, or a respective plane 49' not separately shown, relative to the two tangential planes 38, 39 or 38', 39' respectively in which the clamping surfaces 40, 41 or 40', 41' respectively of the first and second clamping jaws 33, 34 or 33', 34' respectively engage the respective tubular portion 28 or 29. The plane of symmetry 49, 49' contains the axis 21 of the shaft 22 and is represented by a dash-dot line in FIG. 3. Furthermore, the axis of the second joint 44 or 44' and the axis of the third joint 45 or 45' of each clamping device are arranged mirror-symmetrically with respect to each other relative to the plane of symmetry 49 or 49' respectively. Moreover, the joints are arranged so that a first connecting plane 50 or 50' which contains the axes of the second joint and the first further joint of the respective first connecting bar 42 or 42' and is represented by a broken line, and a second connecting plane 51 or 51' which contains the axes of the third joint and the second further joint of the respective second connecting bar 43 or 43' and is also represented by a broken line, intersect each other in the respective plane of symmetry 49 or 49' related to the two tangential planes 38, 39 or 38', 39' respectively.

As can be seen in FIGS. 3 and 4, the first clamping lever and the second clamping lever and the three connecting bars of each of the two clamping devices 30 and 31 are combined in respective unitary elements each forming an integral clamping plate 52 or 52' respectively and the joints of each clamping device are constituted by hinges formed integrally with the respective clamping plate 52 or 52', which hinges are eleastically deformable in a plane substantially perpendicular to the axis 21 of the shaft 22. In this way a particularly simple, compact and stable construction is obtained.

Resilient Expander Embodiment

In this embodiment the third clamping jaw 35 or 35' of each of the two clamping devices 30 and 31 respectively is constituted by a resilient expander which is bent into a V-shape along a line which extends perpendicularly to the respective plane of symmetry 49 or 49'. Each expander comprises a first expander limb 53 or 53' and a second expander limb 54 or 54', and is constituted by a leaf spring which comprises two laminations formed by folding a single layer of material through 180°, the fold being located at a free end 55 or 55' of the respective first expander limb 53 or 53'. The folded free end 55 or 55' of the respective first expander limb 53 or 53', which is disposed on the respective third connecting bar 46 or 46', constitutes the clamping surface of the third clamping jaw 35 or 35'. This surface is rounded due to the fold at the face end of the expander limb 53 or 53', as can be seen in FIG. 4, and engages the corresponding tubular portion 28 or 29 in a further plane 56 or 56' tangential thereto, which plane extends perpendicularly to the longitudinal plane of symmetry 49 or 49' related to the two respective tangential planes 38, 39 or 38', 39' and is represented by a broken line in FIGS. 3 and 4. The free end of the second expander limb 54 or 54' bears against a lug 57 or 57' bent up from the connecting bar 46 or 46', which lug serves as an abutment for the respective expander and is connected to the first connecting bar 42 or 42' and the second connecting bar 43 or 43' through the two further joints 47, 48 or 47', 48' respectively. The force coupling of the third clamping jaw 35 or 35' to the first and second clamping jaws 33, 34 or 33', 34' respectively, which in turn are force-coupled to each other through the first joint 37 or 37', is thus obtained through the third connecting bar 46 or 46', which serves as an abutment for the third clamping jaw and the first and second connecting bars 42, 43 or 42', 43' respectively.

In order to obtain the force coupling between the drum half 17 and the shaft 22, each expander 35 or 35', which serves as the third clamping jaw of the respective clamping device 30 or 30', is adjustable to move its clamping surface, which is constituted by the free end 55 or 55' of the respective first expander limb 53, or 53' in a direction perpendicular to the axis 21 of the shaft 22 relative to the respective third connecting bar 46 or 46', which serves as abutment for the expander. For this purpose a screwthreaded bolt 58, which serves as adjusting device, acts on each expander 35 and 35' at the junction of the two limbs of the expander, the tightening of this bolt causing the two limbs of each expander to be expanded in order to clamp the corresponding tubular portion 28 or 29 onto the shaft 22. For adjusting the two expanders 35 and 35' of the clamping devices 30 and 31 the present embodiment comprises a single bolt, which extends parallel to the axis of the shaft. The bolt 58 passes through a bore 59 in the rotatable drum half 17 and is surrounded in the bore 59 by a sleeve 60, against whose ends the third connecting bars 46 and 46' of the two clamping devices 30 and 31 bear. This defines the distance between the two clamping devices, measured axially of the shaft. The bolt 58 extends through the two expanders 35 and 35', the bolt passing through slots 61 and 61' formed in the expanders for this purpose. The slotted head 62 of the bolt 58 bears against the expander 35', which faces the stationary drum half 16, and a nut 63 on the bolt acts on the expander 35, which is situated adjacent the free end 23 of the shaft 22. In this way the bolt 58 tensions the two expanders 35 and 35', relative to each other. At the end on which the nut 63 is fitted the bolt 58 is formed with a slot 64 to receive a screwdriver or similar tool, so that both the slotted head 62 of the bolt 58 and the nut 63 are readily accessible for actuation near the free end of the shaft.

When adjusting the expanders 35 and 35' of the clamping devices 30 and 31, in order to clamp the tubular portions 28 and 29 onto the shaft 22 by tightening the bolt 58, the two respective clamping levers 33, 34 or 33', 34' and the respective expander 35 or 35' each exert a clamping force P1, P2, P3 respectively or P1', P2', P3' respectively on the respective tubular portion 28 or 29, which forces are directed perpendicularly to the respective tangential planes 38, 39, 56 or 38', 39', 56' in which the respective clamping surfaces 40, 41, 55 or 40', 41', 55' thereof engage the tubular portion 28 or 29 respectively.

The clamping force P1 or P1' exerted on the respective tubular portion 28 or 29 by the first clamping lever 33 or 33' comprises a first force component N1 or N1' respectively having a direction which intersects the axis of the respective first joint 37 or 37' and is perpendicular to the respective plane of symmetry 49 or 49' related to the two tangential planes 38, 39 or 38', 39' respectively. Similarly, the clamping force P2 or P2', exerted on the respective tubular portion 28 or 29 by the second clamping lever 34 or 34' respectively, comprises a first force component N2 and N2' respectively having a direction which intersects the axis of the respective first joint 37 or 37' and is perpendicular to the respective plane of symmetry 49 or 49' related to the two tangential planes 38, 39 or 38', 39' respectively. Therefore, after the clamping operation only forces which extend perpendicularly to the plane of symmetry 49 or 49' are exerted on the first joint, so that the first joint retains the position it has assumed and, consequently, the positions of the first clamping lever 33 or 33' and the second clamping lever 34 or 34' relative to the tubular portion 28 or 29 do not change. Thus it is ensured that the angle of 60° between the two tangential planes 38, 39 or 38', 39' in which the respective clamping surfaces 40, 41 or 40', 41' engage the respective tubular portion 28 or 29 is always maintained. This ensures that the three clamping forces P1, P2, P3 or P1', P2' and P3' act on the respective tubular portion 28 or 29 at locations which are uniformly distributed round the circumference of each portion at 120° from each other, so that the two portions 28 and 29 can be clamped onto the shaft 22 in a perfectly symmetrical manner.

The clamping force P1 or P1' exerted on the respective tubular portion 28 or 29 by the respective first clamping lever 33 or 33' furthermore has a second force component Z1 or Z1' respectively having a direction which extends in the respective first connecting plane 50 or 50' and thus intersects the axis of the respective second joint 44 or 44' and also the axis of the respective first further joint 47 or 47'. In a similar way the clamping force P2 or P2' exerted on the respective tubular portion 28 or 29 by the respective second clamping lever 34 or 34' has a second force component Z2 or Z2' having a direction which extends in the respective second connecting plane 51 or 51' and thus intersects the axis of the respective third joint 45 or 45' and also the axis of the respective second further joint 48 or 48'. The clamping force P3 or P3' exerted on the respective tubular portion 28 or 29 by the respective first expander limb 53 or 53' of the respective expander 35 or 35', which force acts in a direction which intersects the axis of the respective first joint 37 or 37' and extends in the respective plane of symmetry 49 or 49' related to the two tangential planes 38, 39 or 38', 39' respectively, produces a reaction force R1 or R1' which acts on the third connecting bar 46 or 46' through the respective second limb 54 or 54' of the expander. Each limb 54, 54' bears with its free end against the respective angular abutment 57 or 57' on the respective third connecting bar 46 or 46'. The reaction force R1 or R1' is of the same magnitude as the respective clamping force P3 or P3' and also has a direction which extends in the respective longitudinal plane of symmetry 49 or 49'. The reaction force R1 or R1' comprises a first force component K1 or K1', which acts in the respective first. connecting plane 50 or 50' and on the respective first connecting bar 42 or 42' the respective first further joint 47 or 47', and a second force component K2 or K2', which acts in the respective second connecting plane 51 or 51' and on the respective second connecting bar 43 or 43' through the respective second further joint 48 or 48'. The two force components Z1 and K1 or Z1' and K1' of the clamping force P1 or P1' respectively and the respective reaction force R1 or R1' all act in directions which extend in the first connecting plane 50 or 50' respectively, and the force components Z2 and Z2' and K2' of the respective clamping force P2 or P2' and the respective reaction force R1 or R1', all act in directions which extend in the respective second connecting plane 51 or 51'; and are equal because of the equilibrium of forces. Furthermore, owing to the symmetrical construction of each of the two clamping devices 30 and 31 relative to the respective plane of symmetry 49 or 49', the two force components K1, K2 or K1', K2' of the respective reaction force R1 or R1' are also equal. In this way it is achieved that the two clamping forces P1, P2 or P1', P2' and the respective reaction force R1 and R1', and consequently the respective third clamping force P3 or P3', are all equal. This is very important for a clamping action which is uniformly distributed around the circumference of each of the tubular portions 28 and 29, because this results in a uniform load on the shaft, so that the shaft is not deformed when the rotatable drum half 17 is clamped in position.

In order to secure the rotatable drum half 17 to the shaft 22 the respective clamping plates 52 and 52' of the two clamping devices 30 and 31 are first of all placed on the respective tubular portions 28 and 29 and over the sleeve 60, after which the two expanders 35 and 35' and the bolt 58 are fitted, without the bolt 58 exerting an actuating force on the expanders to expand them. The drum half 17 together with the two clamping devices 30 and 31 thus constitute an assembly which can be simply slid onto the shaft 22. After the assembly has been slid onto the shaft, the drum half being accurately positioned in the axial direction by positioning devices, not shown, such as stops or the like, the two clamping devices are actuated simultaneously by simply tightening the bolt 58, and the drum half is clamped in position on the shaft in two clamping zones which are spaced from each other in the axial direction of the shaft. The bolt 58 is tightening by means of, for example, a screwdriver placed in the slot 64 in the bolt, the nut being held with the hand or by means of a tool. In order to remove the rotatable drum half 17 the bolt 58 is simply loosened so that the clamping action of the two clamping devices 30 and 31 is removed and the drum half together with the clamping devices mounted on it can readily be removed from the shaft.

The two clamping devices clamp the two tubular portions onto the shaft in a perfectly symmetrical and statically defined manner, because the three clamping forces acting on each tubular portion are equal and act at angular distances of exactly 120° from each other in a plane which extends perpendicularly to the shaft axis. In this way and deformation of the shaft due to the action of the two clamping devices on the shaft through the tubular portion is prevented. Since the clamping devices each clamp the respective tubular portion onto the shaft at three locations only, only small actuating forces are required for clamping, because each tubular portion need be tightened only in the three clamping areas and not over its entire circumference. For clamping it suffices to tighten one of the clamping jaws of each clamping device; this can be simply effected by means of a single bolt. Moreover, in order to tighten the two clamping devices only very small actuating forces are required, which are exerted by means of the bolt, because the expanders provide a very high force-transmission ratio. Thus, the application of the actuating forces does not give rise to the risk either of deformation of the shaft or damage to the shaft bearings. Since the bolt extends parallel with the shaft axis and the tightening of the bolt is effected from the free end of the shaft, this also yields the advantage of easy accessibility and simplicity of actuation of the clamping device. This ensures that the rotatable drum half can be replaced very easily and rapidly if, for example, the magnetic heads on the drum half are excessively worn or damaged.

The simple construction of each of the two clamping devices, which is mainly attribuable to the construction of the first and second clamping levers and the three connecting bars as an integral clamping to plate, is particularly advantageous. In this way an apparatus is obtained in which the rotatable drum half can be secured to the drive shaft in a very simple, easy and rapid manner and is reliably and exactly retained on said shaft without the risk of deformation of the shaft or damage to the shaft bearings. This ensures that the rotatable drum half rotates absolutely without any unbalance, so that optimum and correct recording and/or reproduction process of video information is always obtained by means of the magnetic heads provided on the rotatable drum half. It is to be noted that in the embodiment described above it is, of course, not essential for the two clamping devices to be fully identical. Especially in respect of the construction of the expanders it is to be noted that it is readily possible to construct the expanders differently from one another in order to obtain different clamping forces in the two axially spaced clamping zones. For example, for compensating for different temperature conditions in the two clamping areas, this may be of importance and of advantage. Clamping forces of different magnitude in the two clamping areas can be obtained by selecting different materials, such as, for example, steel or brass, for the clamping plates of the two clamping devices. Moreover, it is to be noted that the nut on the expander-actuating bolt may be accommodated in a cage, which ensures that the nut is not rotated when the bolt is turned. Such a cage may, for example, be provided in a cover plate which covers the free end of the rotatable drum half and which is secured thereto, which plate need only be formed with a hole through which the slot in the bolt is accessible. Finally, it is to be noted that the rotatable drum half may also be clamped onto the shaft by means of a single clamping device of the construction described in the foregoing.

L-Shaped Clamping Bracket

The embodiment shown in FIGS. 5 and 6 is of a construction similar to that of the embodiment described in the foregoing. However, in this case the third clamping jaw of each of the two clamping devices 30 and 31 is constituted by an L-shaped angular bracket 65 or 65' respectively. The bracket 65 or 65' is pivotably connected to the respective third connecting bar 46 or 46', and bears against a tongue 66 or 66' which is part of the third connecting bar and is slightly bent out of the plane of the respective clamping plate 52, or 52'. In this way the free end of the tongue 66 or 66' constitutes a pivotal axis for the respective bracket 65 or 65', which axis is perpendicular to the respective plane of symmetry 49 or 49' related to the two respective tangential planes 38, 39 or 38', 39'. The force coupling between the respective third clamping jaw 65 or 65' and the first and second clamping jaws 33, 34 or 33', 34', which in turn are force-coupled to the first joint 37 or 37', is thus obtained through the third connecting bar 46 or 46', which acts as an abutment for the third clamping jaw and the first and second connecting bars 42,43 or 42', 43' respectively. The bracket comprises a first limb 67 or 67', which extends substantially parallel to the axis 21 of the shaft 22, and a second limb 68 or 68', which extends substantially perpendicularly to the axis of the shaft. The clamping surface with which the bracket 65 or 65' engages the respective tubular portion 28 or 29 in the respective tangential plane 56 or 56' which is perpendicular to the plane of symmetry 49 or 49', is constituted by that limb surface 69 or 69' of the respective first limb 67 or 67' of the respective bracket 65 or 65' which faces the respective tubular portion 28 or 29.

In order to clamp the tubular portion 28 or 29 onto the shaft 22 a bolt 58, which is common to the two brackets, engages the second limb 68 or 68' of each respective bracket 65 or 65', which bolt extends through the two second limbs and stresses them relative to each other. In this case the bolt extends through a bore 70 in the rotatable drum half 17, which bore has two sections of increased diameter extending one from each end of the bore to receive two spacer sleeves 71 and 72 which surround the bolt 55, the sleeves being inserted in these sections of the bore from opposite ends of the bore. The third connecting bars 46 and 46' of the respective clamping devices 30 and 31 bear against the free ends of the spacer sleeves, so that the two clamping devices are situated at a specific distance from each other in the axial direction of the shaft. The head 62 of the bolt 58, which head is formed with a slot 73, cooperates with the bracket 65 of the clamping device 30, which bracket is situated adjacent the free end of the shaft 22, and the nut 63 engages the bracket 65' of the clamping device 31. To lock nut 63 against rotation the nut is lodged in a correspondingly shaped, forked end 74 of a bracket 75 which is secured to the drum half 17.

The operation of the clamping devices in this embodiment is similar to the operation of the embodiment described in the foregoing. However, it is to be noted that in the present embodiment the reaction force R1 or R1', corresponding to the respective clamping force P3 or P3', is transmitted from the first limb 67 or 67' of the respective bracket 65 or 65' to the respective tongue 66 or 66' of the respective third connecting bar 46 or 46'. Furthermore, it is to be noted that one of the advantages of these clamping devices is that by designing the third clamping jaw as a simple L-shaped bracket a particularly high rigidity and reliability is obtained. It is obvious that in this case also the clamping devices need not be perfectly identical; for example, the brackets of the two clamping devices may have first limbs of different length, so that different clamping forces are obtained in the axially spaced clamping zones, for example, in order to compensate for different temperature conditions at the locations of the two clamping zones. Alternatively, it is possible to use only one such clamping device to secure the rotatable drum half to the shaft.

V-Shaped Clamping Bracket

Figure 7:
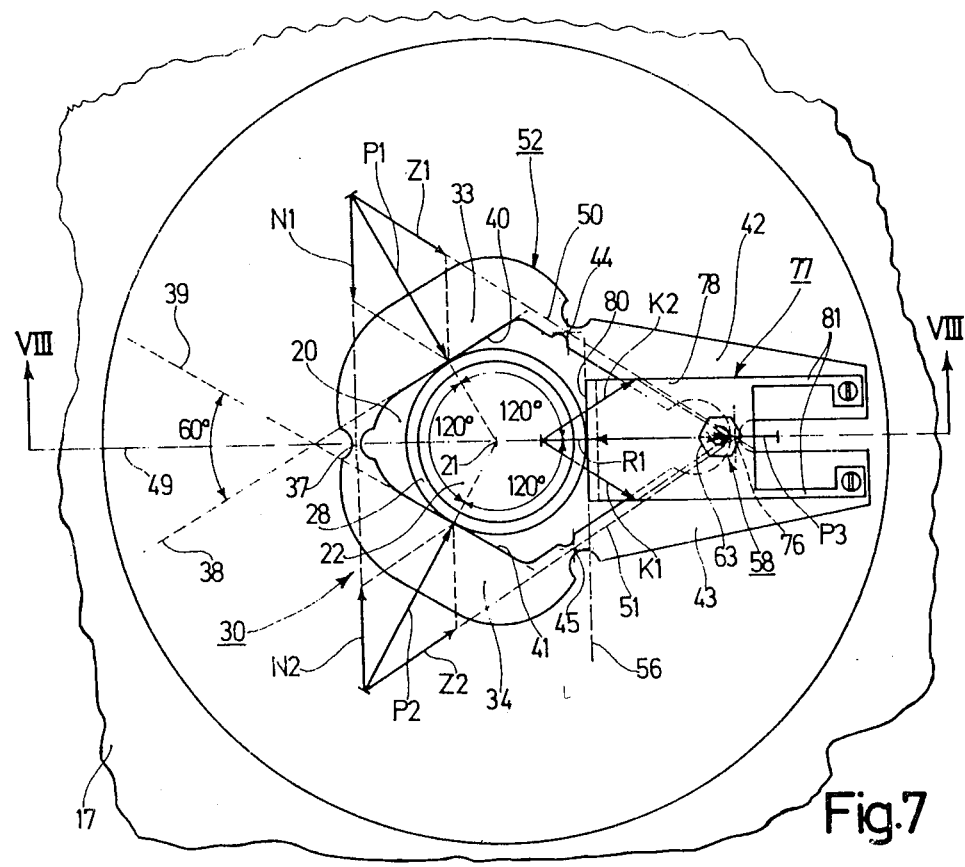
FIG. 7, similarly to FIGS. 3 and 5, is a diagrammatic plan view of a device in accordance with a third embodiment of the invention using a single clamping device with a V-shaped clamping bracket.
Figure 8:
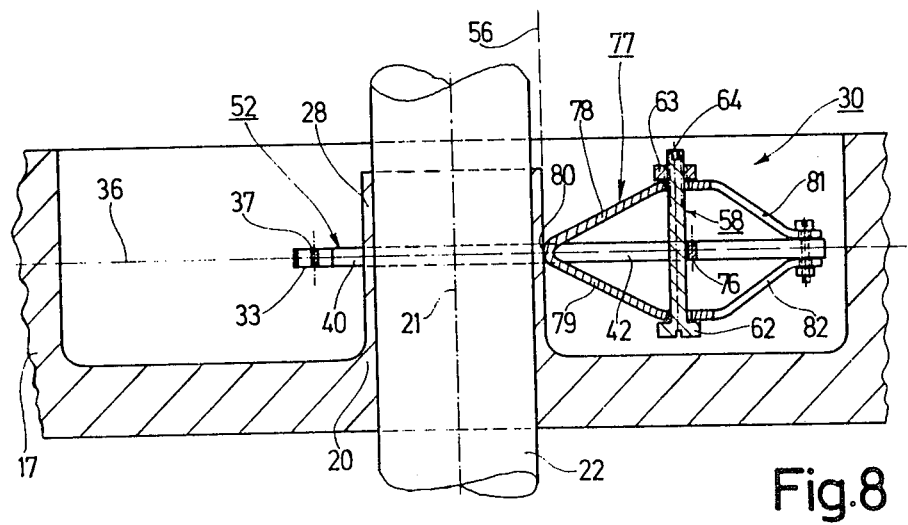
FIG. 8 is a sectional view taken on the line VIII-—VIII in FIG. 7.

FIGS. 7 and 8 show an embodiment in which the rotatable drum half 17 comprises only one tubular portion 28 on its hub 20, so that the drum half 17 is clamped onto the shaft 22 by means of one clamping device 30 only. The clamping device 30 again comprises an integral clamping plate 52, which comprises a first clamping lever 33 and a second clamping lever 34 as well as a first connecting bar 42 and a second connecting bar 43, the two connecting bars 42 and 43 now being interconnected directly through a single further pivotal joint 76.

For the third clamping jaw this embodiment employs a resilient clamping bracket 77, which is bent into a V-shape along a line which is perpendicular to the plane of symmetry 49 related to the two tangential planes 38 and 39, said bracket comprising a first limb 78 and a second limb 79. The two limbs 78 and 79 are arranged mirror-symmetrically with respect to each other relative to the plane of the clamping plate 52. The bend 80 which interconnects the two limbs 78 and 79 constitutes the clamping surface of the third clamping jaw, which surface engages the tubular portion 28 in the ffurther tangential plane 56 which is perpendicular to the longitudinal plane of symmetry 49.

Passing through the free ends of the two limbs 78 and 79, which ends are bent so as to extend substantially parallel to the clamping plate 52, is a bolt 58 which serves as an adjusting device. The head 62 of the bolt cooperates with the free end of the limb 79, and a nut 63 on the bolt cooperates with the free end of the limb 78, so that the two limbs 78 and 79 of the clamping bracket 77 are stressed relative to each other. At its center the bolt 58 bears against the further joint 76. The further joint 76 thus constitutes an abutment on which the clamping bracket 77, which serves as a third clamping jaw, acts through the bolt 58. As a result of this construction the reaction force R1, which corresponds to the clamping force P3, is directly transmitted to the further joint 76 by the bolt 58. The force coupling of the third clamping jaw 77 to the first and the second clamping jaws 33 and 34, which in their turn are force-coupled to each other through the first joint 37, is thus obtained through the further joint 76, which functions as an abutment for the third clamping jaw, and the first and the second connecting bars 42 and 43.

At their free ends the limbs 78 and 79 of the clamping bracket 77 are each extended by a pair of narrow strip-shaped fixing portions 81 and 82, by means of which the clamping bracket 77 is secured to the first connecting bar 42 and to the second connecting bar 43. The fixing portions maintain the clamping bracket 77, together with the associated bolt 58, in a symmetrical position relative to the clamping plate 52, but have no influence on the clamping action of the clamping device.

Since the clamping bracket together with the associated clamping bolt is always connected to the clamping plate through the fixing portions, these components constitute an easy-to-handle assembly, which is very advantageous. This assembly is simply placed onto the tubular portion of a rotatable drum half which is to be mounted on a shaft, without the clamping bracket exerting a clamping action of the tubular portion. Subsequently, the drum half together with the clamping device on its tubular portion is slid onto the shaft and positioned appropriately. After this the clamping device is easily actuated by means of the clamping bolt, which serves as adjusting device, the free ends of the limbs of the clamping bracket being moved towards each other and the clamping surface of the bracket thus being urged against the tubular portion, so that the tubular portion is clamped onto the shaft. In this way the rotatable drum half is tightly secured to the shaft.

The clamping device in accordance with this embodiment of the invention also ensures an accurate, reliable and uniform clamping of the rotatable drum half on the shaft, the clamping action of the clamping device causing no deformation of the shaft. In this case only very small actuating forces are required for tightening the clamping device, because the clamping device acts on the tubular portion at three clamping areas only. Furthermore, it is advantageous with respect to the small actuating force requirement, that the clamping bracket also provides a high force-transmission ratio. Another particularly advantageous feature of this clamping device is its especially simple, easy and rapid actuation. In addition the entire clamping device takes the form of a pre-assembled unit, so it is simple to onto the tubular portion.

Rigidly Connected Jaw Embodiments

FIG. 9 shows an embodiment in which the rotatable drum half 17 again has a tubular portion 28 on its hub, which portion is clamped onto the shaft 20 by means of a clamping device 30. The clamping device 30 comprises a substantially V-shaped plate-shaped clamping member 83 comprising a first limb 84 and a second limb 85 which is rigidly connected thereto. The first limb 84 constitutes the first clamping jaw and the second limb 85 the second clamping jaw of the clamping device 30, which jaws are force-coupled to each other and in this case also form-coupled. A clamping surface 86 or 87 on each of the two limbs 84 and 85 of the clamping member 83 respectively engages the tubular portion 28 in a plane 38 or 39 tangential thereto, which clamping surfaces are constituted by plane edge faces of the limbs 84 and 85. The tangential planes 38 and 39, in which the clamping surfaces 86 and 87 of the first clamping jaw 84 and the second clamping jaw 85 engage the tubular portion, enclose an angle of 60° with each other.

Plate-shaped first and second connecting bars 90 and 91 respectively are pivotally connected to each other and to the respective two limbs 84 and 85 of the plate-shaped clamping member 83 through pivotal joints 88 and 89 respectively. For this purpose a plate-shaped third connecting bar 92 is connected to the first connecting bar 90 through a pivotal joint 93 and to the second connecting bar 91 through a pivotal joint 94. As is shown in FIG. 9, the first and second connecting bars are arranged mirror-symmetrically with respect to each other relative to the longitudinal plane of symmetry 49 related to the two tangential planes 38 and 39, which plane of symmetry contains the axis 21 of the shaft 22, and the third connecting bar 92 is also arranged mirror-symmetrically relative to the plane of symmetry 49. The clamping member 83 and the three connecting bars 90, 91 and 92 are formed as an integral clamping plate 95, the joints 88, 89, 93 and 94 being constituted by hinges formed integrally with the clamping plate, which hinges are deformable in a plane substantially perpendicular to the axis 21 of the shaft 22.

The third connecting bar 92 serves as abutment for a third clamping jaw 96 which is constituted by an expander consisting of a simple leaf spring which is bent into a V-shape along a line which extends perpendicularly to the plane of symmetry 49. This expander has a similar construction to that of the expander of the embodiment described with reference to FIGS. 3 and 4. The expander 96 comprises a first expander limb 97 and a second expander limb 98. The free end 99 of the first expander limb 97, which end bears on the third connecting bar 92, constitutes a clamping surface of the third clamping jaw 96, which surface engages the tubular portion 28 in a further tangential plane 56 which extends perpendicularly to the plane of symmetry 49 related to the two tangential planes 38 and 39 in which the clamping surfaces 86 and 87 of the first clamping jaw 84 and the second clamping jaw 85 engage the tubular portion 28. The free end of the second expander limb 98 is also positioned on the third connecting bar 92 and bears against an abutment formed by a lug 100 up from the third connecting bar. In this way the force coupling of the third clamping jaw 96 to the first and second clamping jaws 84 and 85, which in their turn are force-coupled and form-coupled to each other, is obtained through the third connecting bar 92, which serves as an abutment for the third clamping jaw 96, and the first and the second connecting bars 90 and 91.

For force coupling between the rotatable drum half 17, which serves as a support, and the shaft 22, the expander which forms the third clamping jaw 96 is adjustable by means of the adjusting device to move the clamping surface 99, constituted by the free end of the first expander limb 97, in a direction which is substantially perpendicular to the axis 21 of the shaft 22. In the present case the adjusting device is constituted by a screw 101, whose head 102 bears on the expander 96 at the junction of its two limbs and which passes through a slot 103 in the expander and is screwed into the drum half 17 in a manner not shown. By tightening the screw 101 the expander 96 is urged against the third connecting bar 92, the expander limbs 96 and 98, which bear on the third connecting bar at their free ends, thereby being expanded. The clamping surface 99, which is constituted by the free end of the first expander limb 97, is moved by the third clamping jaw in a direction which is substantially perpendicular to the axis 21 of the shaft 22, the tubular portion 28 being clamped onto the shaft 22 by the three clamping jaws, which are force-coupled to each other.

As is apparent from FIG. 9, with their clamping surfaces 86, 87 and 99 the three clamping jaws 84, 85 and 96, which are force-coupled to each other, engage the tubular portion 28 at locations which are spaced circumferentially of the shaft 22 at an angular distance of 120° from each other substantially in one plane which is perpendicular to the shaft axis. The clamping forces P1, P2 and P3, which are schematically represented in FIG. 9, are also equal.

In this way a clamping device is obtained by means of which the rotatable drum half is clamped onto the shaft in an accurate and reliable manner, the clamping device securing the tubular portion onto the shaft at three clamping areas only, so that the desired clamping action can be obtained by means of a small actuating force. For clamping it suffices to adjust an expander which provides a high force-transmission ratio, by means of a readily accessible screw. Owing to the simple operation of the clamping device the rotatable drum half can be mounted and removed several times in an easy and reproducible manner, for example in order to replace or clean the magnetic heads accommodated on that drum half. The symmetrical pivotal connection of the adjustable clamping jaw to the clamping member ensures a uniform clamping action in a simple manner. Furthermore, it is advantageous that the clamping member and the connecting bars are formed as an integral plate, so that a simple construction of the clamping device is obtained, which clamping device can be manufactured in mass-production quantities in a very economic manner. Thus, an accurate, reliable and simple clamping device is obtained, whose clamping action or actuation cannot give rise to a deformation of the shaft and damage to the shaft bearings, thereby ensuring that the rotatable drum half revolves without unbalance, which as already stated is essential for a satisfactory and disturbance-free recording and/or reproducing process.

The clamping device 30 in the embodiment shown in FIG. 10 also comprises an essentially V-shaped plate-shaped clamping member 83 having a first limb 84 and a second limb 85, which are force-coupled and form-coupled to each other. The two limbs 84 and 85 constitute the first and second clamping jaws of the clamping device and each comprise a clamping surface 86 or 87 respectively which engages the tubular portion 28 in a plane 38 or 39 tangential thereto. The third clamping jaw 96 is formed by an expander 96 similar to the expander 96 in the embodiment shown in FIG. 9, the free end 99 of the the first expander limb 97 constituting the clamping surface of the third clamping jaw, which surface engages the tubular portion 28 in the further tangential plane 56 which extends perpendicularly to the plane of symmetry 49 related to the two tangential planes 38 and 39. In order to obtain the force coupling between the rotatable drum half 17 and the shaft 22, the third clamping jaw 96 is adjustable by means of the screw 101, which serves as an adjusting device, to move the clamping surface 99 of the clamping jaw 96 perpendicularly to the axis 21 of the shaft 22.

In this embodiment the abutment for the third clamping jaw 96 is constituted by a plate-shaped connecting bar 104, which is arranged symmetrically relative to the plane of symmetry 49 related to the two tangential planes 38 and 39, and which is rigidly connected to the two limbs 84 and 85 of the clamping member 83. The clamping member 83 and the connecting bar 104 together constitute an integral clamping plate 105. The expander is positioned with the free ends of its two expander limbs 97 and 98 bearing on the connecting bar 104, which serves as abutment for the expander 96, the free end of the second expander limb 98 bearing against a lug 106 bent up from the connecting bar 104. In this way the force coupling between the third clamping jaw 96 and the first and second clamping jaws 84 and 85, which themselves are force-coupled and form-coupled to each other, is obtained through the connecting bar 104, which serves as abutment for the third clamping jaw 96 and which is force-coupled and form-coupled to the integral clamping plate 105 by the first and second clamping jaws.

In this embodiment the force-coupled clamping jaws also engage the tubular portion with equal force at three locations which are spaced at an angular distance of 120° from each other circumferentially of the shaft in one plane which is perpendicular to the shaft, so that an accurate, reliable and statically defined clamping action is obtained. The clamping device in accordance with this embodiment is of a very simple construction, which is of advantage with respect to the robustness and reliability of the clamping device.

Figure 11:
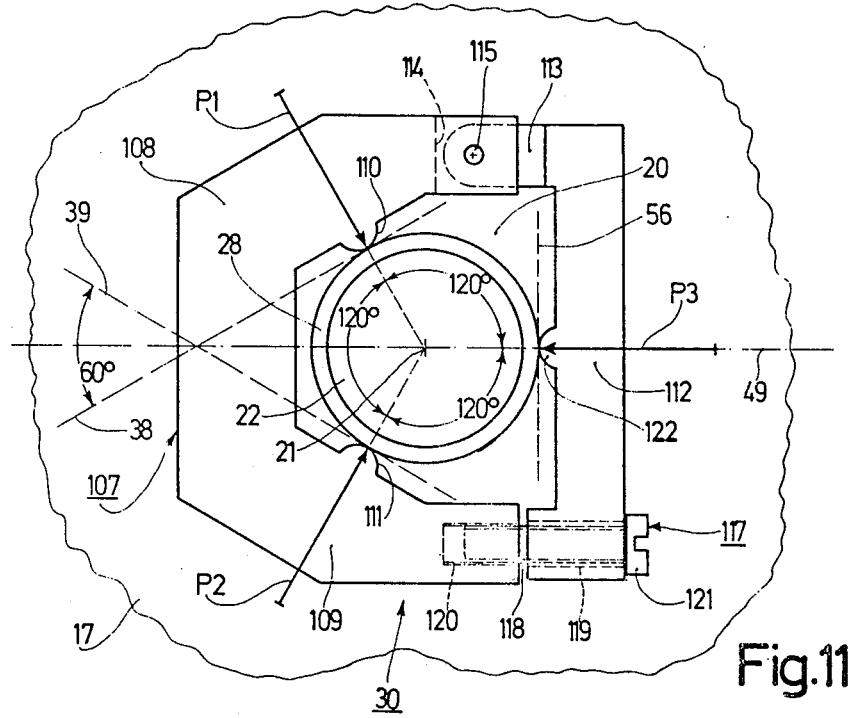
FIG. 11 is a plan view of a sixth embodiment of the invention permitting radial installation of the clamping device.

FIG. 11 shows a clamping device 30 having a substantially V-shaped clamping member 107, whose two limbs 108 and 109, which serve as first and second clamping jaws, have clamping surfaces in the form of protrusions 110 and 111 which project from the limbs in the direction of the axis 21 of the shaft 22. The protrusions 110 and 111 engage the tubular portion 28 in planes 38 and 39 tangential thereto, the two tangential planes enclosing an angle of 60° with each other. The third clamping jaw of this clamping device essentially takes the form of a bar 112. The bar 112 comprises an angled end 113 which is reduced in thickness and engages in a groove-like recess 114 in the free end of the first limb 108 of the clamping member 107 and is directly connected to the first limb 108 through a pivotal joint 115. At the other end the bar 112 is connected to the other limb 108 of the clamping member 107 through a screw 117 which serves as an adjusting device and extends substantially transversely of the axis 21 of the shaft 22, in order to obtain force coupling between the rotatable drum half 17 and the shaft 22. For this purpose the threaded stem 118 of the screw passes through a bore 119 formed in the bar end 116 and is screwed into a threaded bore 120 in the limb 109 of the clamping member 107, the head 121 bearing against the bar end 116. In this way the third clamping jaw 112 is force-coupled to the first clamping jaw 108 through the joint 115 and to the second clamping jaw 109 via the screw 117, the first and second clamping jaws themselves being force-coupled and form-coupled to the integral clamping member 107.

The clamping surface of the bar 112 is constituted by a protrusion 122 which projects in the direction of the shaft axis. This protrusion engages the tubular portion 28 in the further tangential plane 56 which extends perpendicularly to the plane of symmetry 49 related to the two tangential planes 38 and 39 in which the protrusions 110 and 111 engage the tubular portion 28, which plane of symmetry contains the axis 21 of the shaft 22. In order to obtain the force coupling between the rotatable drum half 17 and the shaft 22, the bar 112 serving as the third clamping jaw is adjustable by means of the screw 117 to move the protrusion 122, which serves as the clamping surface of the third clamping jaw, in a direction which is substantially perpendicular to the axis 21 of the shaft 22.

To clamp the tubular portion 28 onto the shaft 22 the screw 117 is tightened. The three protrusions 110, 111 and 122 then engage the tubular portion 28 with equal forces P1, P2 and P3 at three locations which are spaced at an angular distance of 120° from each other circumferentially of the shaft in one plane which is perpendicular to the shaft axis. This clamping device also requires only a small actuating force, because the clamping device acts not over the entire circumference of the tubular portion but only at three clamping areas which are uniformly spaced from each other. This clamping device also has a very simple construction and, before the screw 117 is fitted, can be opened by swinging the bar 112 through 90° or more relative to the clamping member 107, so that the device can be placed on the tubular portion 28 in a radial direction.

Ring-Tongue Embodiment

Figure 12:
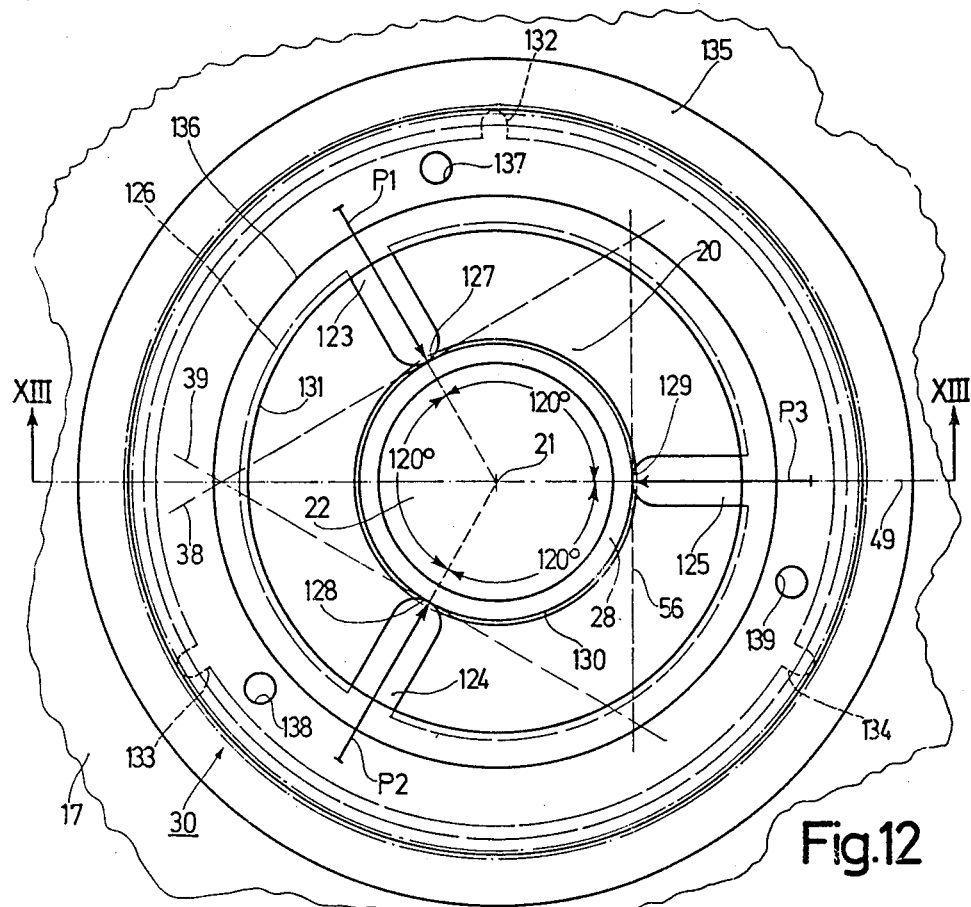
FIG. 12, similarly to FIGS. 3 and 5, is a plan view of a seventh embodiment of the invention having a ring with radial tongues.
Figure 13:
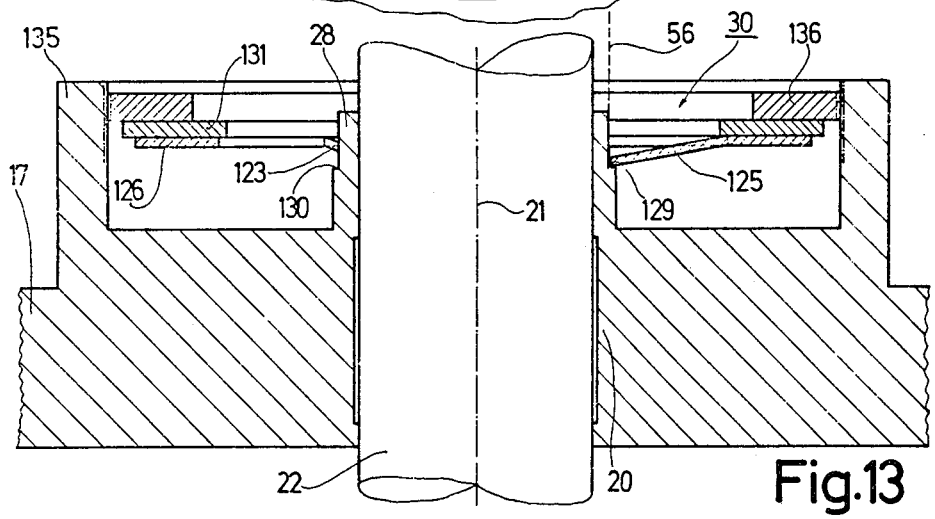
FIG. 13 is a sectional view taken on the line VIII-—VIII in FIG. 12.

The embodiment shown in FIGS. 12 and 13 comprises a clamping device 30 in which, in order to obtain the force coupling between the rotatable drum half 17 and the shaft 22, all three clamping jaws are adjusted by means of an adjusting device to move their clamping surfaces in a direction which is substantially perpendicular to the axis 21 of the shaft 22. The first clamping jaw 123, the second clamping jaw 124 and the third clamping jaw 125 of this clamping device 30 are each constituted by a tongue which projects radially towards the shaft from a ring 126 which is coaxial with the shaft 22, the tongues being inclined relative to the shaft 22 and to the plane of the ring 126. The three clamping jaws 123, 124 and 125 constituted by the tongues are force-coupled to each other through the ring 126. The three tongues are spaced at an angular distance of 120° from each other circumferentially of the shaft and are inclined towards the drum half 17 from the ring 126. The free ends 127, 128 and 129 of the tongues 123, 124 and 125, which ends are semi-circular, constitute the clamping surfaces of the clamping jaws and each engage the tubular portion 28 in a plane 38, 39 and 56 respectively tangential to the drum portion. The tubular portion 28 comprises a step 130, on which the tongues bear at their free ends. This ensures that the three clamping jaws engage the tubular portion in one plane perpendicular to the shaft axis.

Mounted on the ring 126 is a compression ring 131, which is retained in a position which is coaxial with the axis of the shaft and thus coaxial with the ring 126 by three radial projections 132, 133 and 134 which engage the inner surface of a hollow cylindrical portion 135 of the rotatable drum half 17, which portion 135 is coaxial with the axis 21 of the shaft 22. The compression ring 131 bears against an externally screwthreaded ring 136 which serves as an adjusting device and which cooperates with a screwthread on the inner surface of the portion 135 of the drum half 17 so as to be adjustable axially of the shaft 22. The threaded ring 136 has three apertures 137, 138 and 139, to receive a suitable tool for tuning the threaded ring.

In order to obtain the force coupling between the rotatable drum half 17 and the shaft 22, when the ring 126 has been placed on the tubular portion 28 and the compression ring 131 has been fitted, the threaded ring 136, which serves as an adjusting device, is tightened in the portion 135 in the direction of the drum half 17. This adjusting movement of the threaded ring 136 is uniformly transmitted to the ring 126 by means of the compression ring 131, so that the ring 126 is moved towards the drum half 17 in the direction of the axis 21 of the shaft 22. The free ends 127, 128 and 129 of the tongues 123, 124 and 125, which initially rest loosely on the step 130, are consequently moved towards the shaft axis in directions substantially perpendicular to the shaft axis until they engage the cylindrical surface of the tubular portion 28 and clamp said portion firmly to the shaft.

In this way a simple clamping device is obtained, which in a simple manner provides a uniform clamping action. Since the clamping device acts on the tubular portion 28 at only three clamping areas, only a small actuating force is required. The actuating force required can be made very small by a suitable choice of the angle of inclination of the tongues 123, 124 and 125 relative to the plane of the ring 126; if the tongues have only a small angle of inclination, for example 3° to 5°, a very high force-transmission ratio is obtained between the actuating force to be applied by means of the threaded ring 136 and the clamping forces exerted by the tongues. Suitably, the ring 126 and the tongues may consist of a retract material, so that when the clamping device is released by turning the threaded ring the tongues automatically resile from the tubular portion 28 and no longer exert a clamping action thereon. Furthermore, it is to be noted that it is not strictly necessary to provide the tubular portion 28 with a step for supporting the free ends of the tongues. It is alternatively possible for the tubular portion to be unstepped and the free ends of the tongues to be retained in a plane perpendicular to the shaft axis by means of an addition tool during the clamping operation, in which plane they are retained after clamping by the friction between the clamping surfaces and the tubular portion. As an adjusting device, instead of the threaded ring 136 it is possible to have, for example, three screws extending through the ring 126 adjacent the tongues and screwing into the rotatable drum half.

Other embodiments of clamping devices are possible within the scope of the invention, for example with respect to the third clamping jaw which may take the form of a slide on the third connecting bar, which slide is adjustable in a direction perpendicular to the shaft axis, its adjustment being effected with a screw which cooperates therewith. The clamping jaws and connecting bars need not be plate-shaped. but may alternatively have substantial dimensions in all directions. Furthermore, when two clamping devices are used for mounting a rotatable drum half on the shaft, it is also possible to employ two separate adjusting devices, for example in the form of screws. The support for the magnetic head or heads need not be a drum half which at the same time serves as a tape guide; clamping devices in accordance with the invention are equally suitable for use in conjunction with a disc-shaped magnetic-head support which is arranged between two stationary halves of a tape guide drum, the magnetic heads cooperating with the tape through a gap formed between the two stationary drum halves. Neither need the magnetic-head support be rotationally symmetrical; it may, for example, take the form of an arm. Depending on the manner in which the tape passes around the tape-guide drum, the magnetic heads may scan information tracks which extend obliquely relative to the longitudinal direction of the tape or tracks which are oriented substantially transversely of the longitudinal direction of the tape or which extend in the longitudinal direction thereof.

What is claimed is:

1. A rotating head recorder for use with a magnetizable record carrier in the form of a tape, comprising
    a rotatable shaft,
    a support having a hub, force-coupled to said shaft, said hub comprising at least one axially projecting tubular portion coaxial with said shaft,
    at least one magnetic head mounted on said support for rotation therewith for scanning a record carrier along information tracks, and
    a releasable clamping device for engaging said hub portion and clamping it on the shaft so as to provide the force coupling between the support and the shaft,
    characterized in that the clamping device comprises:
    first, second and third clamping jaws force-coupled to each other and each having a clamping surface arranged to engage the tubular portion of the hub in a plane tangential thereto, said clamping surfaces engaging the tubular portion at locations spaced circumferentially about the shaft at an angular separation of 120° from each other substantially in one plane perpendicular to the shaft axis,
    an adjusting device for adjusting said third clamping jaw only, for moving its clamping surface in a direction substantially perpendicular to the shaft axis, and
    means interconnecting said three jaws for causing each of the three clamping jaws to exert an equal clamping force on the tubular portion directed perpendicularly to a tangential plane in which the clamping surface of the respective clamping jaw engages the tubular portion, thereby obtaining force coupling between the support and the shaft.

2. A recorder as claimed in claim 1, characterized in that said means comprise a first pivotal joint interconnecting said first and second clamping jaws, a first connecting bar connected at a first end to the first clamping jaw by a second pivotal joint, a second connecting bar connected at a first end to the second clamping jaw by a third pivotal joint, and means for connecting other ends of said first and second connecting bars to each other, said means for connecting comprising at least one further pivotal joint, said tangential planes of engagement by the first and second clamping jaws enclose an angle of 60° with each other,
    the axes of all said joints extend substantially parallel to the shaft axis, the axis of said first joint being disposed in a longitudinal plane of symmetry relative to the two tangential planes of engagement of the first and second clamping jaws, said longitudinal plane of symmetry containing the shaft axis; and the axes of the second and third joints being arranged mirror-symmetrically with respect to each other relative to said longitudinal plane of symmetry,
    a first connecting plane containing the axes of said second joint and the at least one further joint at said other end of the first connecting bar, and a second connecting plane containing the axes of the third joint and the at least one further joint at said other end of the second connecting bar, intersecting each other in said longitudinal plane of symmetry, and
    said clamping device further comprises an abutment disposed adjacent said at least one further joint and connected thereto, said third clamping jaw being arranged to bear against said abutment and arranged such that the plane of engagement of the third jaw clamping surface is a further plane extending perpendicularly to said longitudinal plane of symmetry, said adjusting device adjusting the third clamping jaw to move its clamping surface relative to the abutment in a direction substantially perpendicular to the shaft axis.

3. A recorder as claimed in claim 2, characterized in that said means for connecting comprises a third connecting bar extending between said other ends of said first and second connecting bars, connected to the first connecting bar through a first further pivotal joint and to the second connecting bar through a second further pivotal joint, the axes of the second joint and the first further joint lying in the first connecting plane, and the axes of the third joint and the second further joint lying in the second connecting plane.

4. A recorder as claimed in claim 3, characterized in that the third clamping jaw is constituted by a resilient expander bent into a substantially V-shape along a line extending perpendicularly to said longitudinal plane of symmetry, said expander comprising a first expander limb having a free end constituting the clamping surface of the third clamping jaw, and a second expander limb having a free end arranged to bear against the third connecting bar; and said adjusting device comprises a screwthreaded member which acts on the expander substantially at the junction of said first and second limbs, for expanding the limbs by actuation of said screwthreaded device to clamp the tubular portion onto the shaft.

5. A recorder as claimed in claim 4, characterized in that the expander is formed by a substantially V-shaped leaf spring comprising at least two laminations.

6. A recorder as claimed in claim 4, characterized in that said third clamping jaw is formed by an L-shaped bracket, supported on said third connecting bar and arranged to be pivotable relative to said third connecting bar about an axis perpendicular to said plane of longitudinal symmetry; said bracket comprising a first limb which extends substantially parallel to the shaft axis, and a second limb which extends substantially perpendicularly to the shaft axis, the clamping surface of the third clamping jaw being formed on the first limb; and said adjusting device is a screwthreaded device arranged to act on the second limb, for pivoting the bracket with respect to the third connecting bar to clamp the tubular portion onto the shaft.

7. An apparatus as claimed in claim 1, 2, 3, 4, 5 or 6, characterized in that the support hub has two tubular portions projecting axially in opposite directions from the hub, coaxial with the shaft, the recorder comprises two clamping devices, one arranged to engage such respective tubular portion, the respective third clamping jaws of the two clamping devices are arranged mirror symmetrically with respect to each other relative to a transverse plane of symmetry perpendicular to the shaft axis between the two clamping devices, and the recorder further comprises a single screwthreaded adjusting device for adjusting the two third clamping jaws, extending parallel to the shaft axis through the two third clamping jaws, and actuable to exert simultaneous equal force against each of said third clamping jaws for tightening said jaws and thereby clamping each of said tubular portions onto the shaft.

8. A recorder as claimed in claim 1, 2, 3, 4, 5 or 6, characterized in that the first and second clamping jaws and the connecting bars of a clamping device are made as one unitary clamping plate, the pivotal joints being constituted by elastically deformable hinges formed integrally with the clamping plate.

9. A rotating head recorder for use with a magnetizable record carrier in the form of a tape, comprising
a rotatable shaft,
a support having a hub, force-coupled to said shaft, said hub comprising at least one axially projecting tubular portion coaxial with said shaft,
at least one magnetic head mounted on said support for rotation therewith for scanning a record carrier along information tracks, and
a releasable clamping device for engaging said hub portion and clamping it on the shaft so as to provide the force coupling between the support and the shaft, characterized in that the clamping device comprises first, second and third clamping jaws, each having a respective clamping surface for engaging the tubular portion in a plane tangential thereto at locations spaced circumferentially of the shaft at an angular separation distance of 120° from each other substantially in one plane perpendicular to the shaft axis, said first and second clamping jaws are rigidly connected to each other and constituted by two limbs of a substantially V-shaped clamping member, the two tangential planes in which the clamping surfaces of the first and second jaws engage the tubular portion enclosing an angle of 60° with each other symmetrically about a longitudinal plane of symmetry in which the shaft axis lies, the third clamping jaw clamping surface plane of engagement is a further plane extending perpendicular to said longitudinal plane of symmetry, said third clamping jaw being adjustable to move its clamping surface in a direction substantially perpendicular to the shaft axis, the clamping device further comprises means for force-coupling said third clamping jaws to each of said first and second jaws respectively, and an adjusting device for adjusting said third clamping jaw thereby causing all three jaws to press against the tubular portion and clamp the tubular portion onto the shaft.

10. A recorder as claimed in claim 9, characterized in that the third clamping jaw is pivotally connected to at least one of the two limbs of the clamping member.

11. A recorder as claimed in claim 16, characterized in that said means for force coupling comprises two connecting bars each having one end connected to a respective one of the two limbs of the clamping member through pivotal joints, each connecting bar having a second end, means for pivotally connecting the second ends of said bars to each other, arranged mirror symmetrically with respect to each other relative to said longitudinal plane of symmetry, said means for connecting further comprising an abutment which is disposed substantially symmetrically relative to said longitudinal plane of symmetry, said third clamping jaw bearing against said abutment and being adjustable relative thereto for moving the clamping surface of said third clamping jaw in a direction substantially perpendicular to the shaft axis.

12. A recorder as claimed in claim 10, characterized in that the third clamping jaw is formed as a bar having one end connected through a pivotal joint to one limb of the clamping member, the other end of the bar being connected to the other limb of the clamping member through said adjusting device, said adjusting device being a screw whose axis lies in a plane substantially perpendicular to the shaft axis.

13. A rotating head recorder for use with a magnetizable record carrier in the form of a tape, comprising
a rotatable shaft,
a support having a hub, force-coupled to said shaft, said hub comprising at least one axially projecting tubular portion coaxial with said shaft, at least one magnetic head mounted on said support for rotation therewith for scanning a record carrier along information tracks, and a releasable clamping device for engaging said hub portion and clamping it on the shaft so as to provide the force coupling between the support and the shaft, characterized in that the clamping device comprises a ring having three tongues, said ring being coaxial with the shaft and lying in a plane substantially perpendicular to the shaft, each of said tongues projecting radially toward the shaft and inclined relative to the shaft and to the plane of the ring; each of said tongues constituting a respective one of said jaws and having a free end constituting a clamping surface arranged to engage the tubular portion in a plane tangential thereto at locations spaced circumferentially of the shaft at an angular distance of 120° from each other substantially in one plane perpendicular to the shaft axis, and an adjusting device for moving the ring in the direction of the shaft axis, thereby adjusting all three clamping jaws to move their clamping surfaces in directions substantially perpendicular to the shaft axis, whereby each of said clamping jaw is force-coupled to each of the others for clamping the tubular portion into the shaft.

14. A clamping arrangement for a hub which is to be force-coupled to a shaft, comprising a hub having at least one axially projecting tubular portion coaxial with the shaft, and a releasable clamping device placed on and engaging said portion for clamping it to the shaft, characterized in that the clamping device comprises:

first, second and third clamping jaws force-coupled to each other and each having a clamping surface arranged to engage the tubular portion of the hub in a plane tangential thereto, said clamping surfaces engaging the tubular portion at locations spaced circumferentially about the shaft at an angular separation of 120° from each other substantially in one plane perpendicular to the shaft axis, an adjusting device for adjusting said third clamping jaw only, for moving its clamping surface in a direction substantially perpendicular to the shaft axis, and means interconnecting said three jaws for causing each of the three clamping jaws to exert an equal clamping force on the tubular portion directed perpendicularly to a tangential plane in which the clamping surface of the respective clamping jaw engages the tubular portion, thereby obtaining force coupling between the support and the shaft.

15. An arrangement as claimed in claim 14, characterized in that said means comprise a first pivotal joint interconnecting said first and second clamping jaws, a first connecting bar connected at a first end to the first clamping jaw by a second pivotal joint, a second connecting bar connected at a first end to the second clamping jaw by a third pivotal joint, and means for connecting other ends of said first and second connecting bars to each other, said means for connecting comprising at least one further pivotal joint, said tangential planes of engagement by the first and second clamping jaws enclosing an angle of 60° with each other, the axes of all said joints extend substantially parallel to the shaft axis, the axis of said first joint being disposed in a longitudinal plane of symmetry relative to the two tangential planes of engagement of the first and second clamping jaws, said longitudinal plane of symmetry containing the shaft axis; and the axes of the second and third joints being arranged mirror-symmetrically with respect to each other relative to said longitudinal plane of symmetry, a first connecting plane containing the axes of said second joint and the at least one further joint at said other end of the first connecting bar, and a second connecting plane containing the axes of the third joint and the at least one further joint at said other end of the second connecting bar, intersecting each other in said longitudinal plane of symmetry, and said clamping device further comprises an abutment disposed adjacent said at least one further joint and connected thereto, said third clamping jaw being arranged to bear against said abutment and arranged such that the plane of engagement of the third jaw clamping surface is a further plane extending perpendicularly to said longitudinal plane of symmetry, said adjusting device adjusting the third clamping jaw to move its clamping surface relative to the abutment in a direction substantially perpendicular to the shaft axis.

16. An arrangement as claimed in claim 15, characterized in that said means for connecting comprises a third connecting bar extending between said other ends of said first and second connecting bars, connected to the first connecting bar through a first further pivotal joint and to the second connecting bar through a second further pivotal joint, the axes of the second joint and the first further joint lying in the first connecting plane, and the axes of the third joint and the second further joint lying in the second connecting plane.

17. An arrangement as claimed in claim 16 characterized in that the third clamping jaw is constituted by a resilient expander bent into a substantially V-shape along a line extending perpendicularly to said longitudinal plane of symmetry, said expander comprising a first expander limb having a free end constituting the clamping surface of the third clamping jaw, and a second expander limb having a free end arranged to bear against the third connecting bar; and said adjusting device comprises a screwthreaded member which acts on the expander substantially at the junction of said first and second limbs, for expanding the limbs by actuation of said screwthreaded device to clamp the tubular portion onto the shaft.

18. An arrangement as claimed in claim 17, characterized in that the expander is formed by a substantially V-shaped leaf spring comprising at least two laminations.

19. An arrangement as claimed in claim 17, characterized in that said third clamping jaw is formed by an L-shaped bracket, supported on said third connecting bar and arranged to be pivotable relative to said third connecting bar about an axis perpendicular to said plane of longitudinal symmetry; said bracket comprising a first limb which extends substantially parallel to the shaft axis, and a second limb which extends substantially perpendicularly to the shaft axis, the clamping surface of the third clamping jaw being formed on the first limb; and said adjusting device is a screwthreaded device arranged to act on the second limb, for pivoting the bracket with respect to the third connecting bar to clamp the tubular portion onto the shaft.

20. An arrangement as claimed in claim 14, 15, 16, 17, 18, 19, characterized in that the support hub has two tubular portions projecting axially in opposite directions from the hub, coaxial with the shaft, the arrangement comprises two clamping devices, one arranged to engage each respective tubular portion, the respective third clamping jaws of the two clamping devices are arranged mirror symmetrically with respect to each other relative to a transverse plane of symmetry perpendicular to the shaft axis between the two clamping devices, and the arrangement further comprises a single screw-threaded adjusting device for adjusting the two third clamping jaws, extending parallel to the shaft axis through the two third clamping jaws, and actuable to exert simultaneous equal force against each of said third clamping jaws for tightening said jaws and thereby clamping each of said tubular portions onto the shaft.

21. An arrangement as claimed in claim 14, 15, 16, 17, 18, 19, characterized in that the first and second clamping jaws and the connecting bars of a clamping device are made as one unitary clamping plate, the pivotal joints being constituted by elastically deformable hinges formed integrally with the clamping plate.

* * * * *

UNITED STATES PATENT AND TRADEMARK OFFICE
CERTIFICATE OF CORRECTION

PATENT NO. : 4,464,690

DATED : August 7, 1984

INVENTOR(S) : LUBOMIR HANECKA ET AL

It is certified that error appears in the above-identified patent and that said Letters Patent is hereby corrected as shown below:

Claim 7, line 6, change "such" to --each--

(Col. 23, line 37)

Claim 9, line 37, change "jaws" to --jaw--

(Col. 24, line 26)

Signed and Sealed this

Twenty-fifth Day of December 1984

[SEAL]

Attest:

*Attesting Officer*

GERALD J. MOSSINGHOFF

*Commissioner of Patents and Trademarks*